W. D. NEILS.
SPRING WHEEL.
APPLICATION FILED JAN. 23, 1920.
1,402,882.
Patented Jan. 10, 1922.
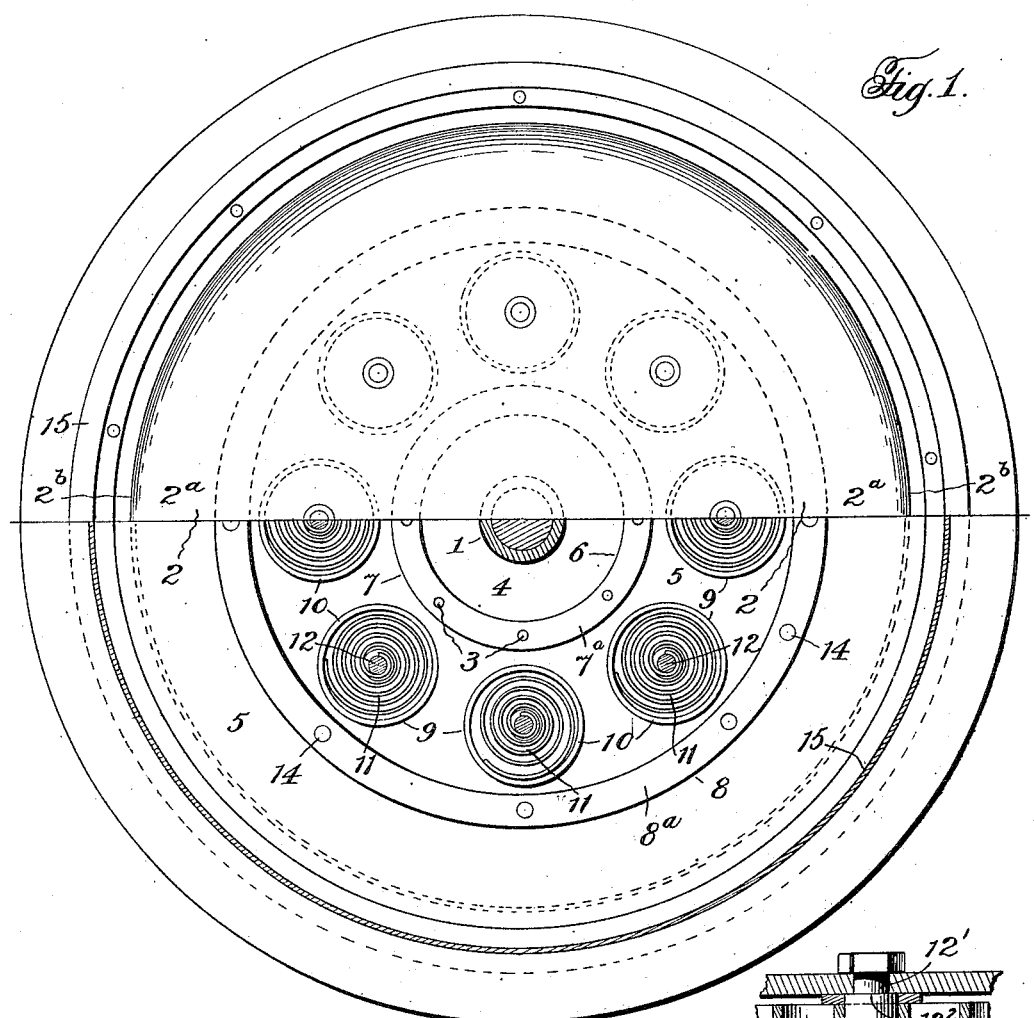
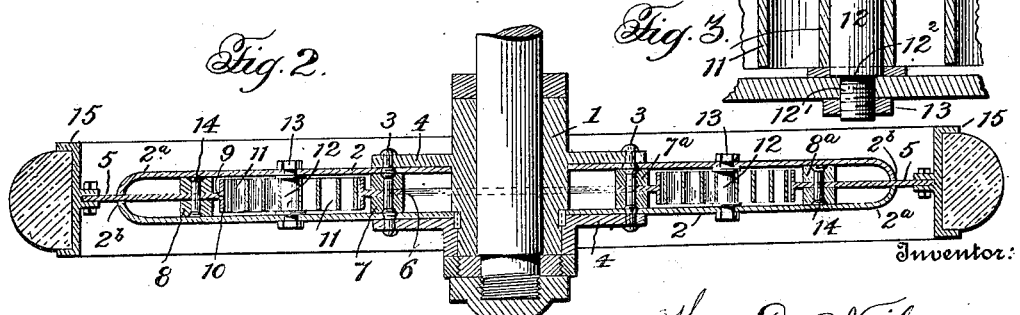
Witness:
Jas. E. Hutchinson
Inventor:
Wm. D. Neils,
By Bollinger & Block
Attorneys

UNITED STATES PATENT OFFICE.

WILLIAM D. NEILS, OF DAVENPORT, IOWA.

SPRING WHEEL.

1,402,882.  Specification of Letters Patent. Patented Jan. 10, 1922.

Application filed January 23, 1920. Serial No. 353,438.

*To all whom it may concern:*

Be it known that I, WILLIAM D. NEILS, a citizen of the United States, and a resident of Davenport, in the county of Scott and State of Iowa, have invented certain new and useful Improvements in Spring Wheels, of which the following is a specification, reference being had therein to the accompanying drawing.

This invention relates to improvements in spring wheels, and aims to provide an improved simple, practical resilient wheel structure capable in itself of affording the required cushioning action against shocks and strains, and that will be strong and durable, the necessity for pneumatic tires being entirely avoided.

An important novel feature of the invention resides in the special construction and arrangement of parts whereby the cushioning means is fully enclosed and protected, and a simple cheap construction produced.

The invention, with other objects and advantages thereof and the particular construction, combination and arrangement of parts comprising the same, will be understood from the following detailed construction when considered in connection with the accompanying drawings forming part hereof and illustrating one embodiment of the invention.

In the drawings:—

Figure 1 is a side elevation of a wheel constructed in accordance with the invention, parts being shown in section;

Figure 2 is a transverse section of the wheel; and

Figure 3 is an enlarged detail section illustrating the spring mounting.

While I have illustrated a specific embodiment of the invention in the drawings, it will of course be understood that minor changes and variations in the particular construction shown, and the embodiment of the invention in other forms as will appeal to those skilled in the art and falling within the scope of the appended claims, may be practiced without departing from the spirit of the invention.

The invention comprehends a wheel comprising a hub part with spaced parallel plates rigid therewith, an outer body part supported between the parallel plates of the hub for vertical movement relatively thereto, and spring connections between the relatively movable parts including a series of transversely disposed chambers arranged at regular intervals around the wheel on one of the wheel parts between said hub plates, and spring members seated in the chambers and connected with the other wheel part, said spring members being adapted to act jointly in yieldably supporting the load and cushioning the same against shocks.

Referring in detail to the construction shown, 1 designates the hub of the wheel. 2 are spaced parallel plates rigid with the hub 1, the plates being conveniently formed as separate parts and suitably secured by rivets 3 or the like to flanges 4 on the hub, one of said flanges 4 being removable to facilitate the assembling of the parts. The outer body part of the wheel consists of a disk member 5 positioned between the plates 2 and supported thereby for vertical play relatively to the hub 1, the disk 5 being provided with a central opening 6 to accommodate the hub 1, and with annular bearings 7—8 slidably engaging the opposing faces of the hub plates. The body part 5 has a plurality of circular openings 9 therein equally spaced therearound, and rigidly secured to said body 5 in the openings 9 are cylinders 10 forming cylindrical transversely disposed chambers. Positioned within the chambers 10 are a series of spiral springs 11, the inner ends of the springs being securely fastened to a plurality of bolts 12 extending through the openings 9 in the body member 5 from the plates 2, and the outer ends of the spiral springs 11 being free and loosely engaging the walls of the transverse chambers 10. The bolts 12 have reduced end portions 12' with shoulders $12^2$ to fit against the hub plates, said bolts 12, with nuts 13, constituting means for securely connecting the plates 2 together and holding the same in proper spaced relationship, and also serving as bearing members for the inner portions of the spring elements 11.

The annular bearings 7—8 consist of pairs of rings $7^a$—$8^a$ arranged opposite each other at opposite sides of the disk member 5 and secured thereto by rivets 14 or equivalent fastening means, the rings $7^a$—$8^a$ being constructed of metal having the necessary wearing qualities to provide durable and efficient outer bearing faces. The bearing 7 is located adjacent the central opening 6 in the disk member 5, and the bearing 8 just beyond the ring of openings 9 in the disk member 5, the pairs of rings not only serving as bearings for the movable body member 5, but also as reinforcing and strengthening means for the same.

The hub plates 2 at their outer marginal portions have inwardly curved extensions 2ª, the ends 2ᵇ of which make a close sliding fit with the side faces of the movable body member 5. Any suitable form of tread may be employed, the construction shown consisting of a channeled rim part 15, and a solid ruber tire of one of the conventional types seated therein.

The arrangement of the springs 10, which are of the required strnegth and properly tensioned, is such that the load is equally distributed throughout the same, and they act in conjunction with each other to absorb or reduce shocks and strains, the wheel structure itself affording the required resiliency and cushioning medium, and avoiding the necessity for pneumatic tires.

It will be noted that the special construction and arrangement of parts hereinbefore described affords a strong, durable wheel structure, and the resilient connections between the parts are completely housed and protected.

What I claim is:

1. In a wheel of the character described, a hub member, a tread member, and resilient connections therebetween comprising side plates secured to the hub member and relatively free at their outer edges to provide a passageway therebetween, a ring shaped flat disk like member secured at its outer edge to the tread member and relatively free at its inner edge, said last mentioned member passing between the side plates and having therebetween a circular series of spring pockets formed by tubular portions projecting outwardly from the opposite faces of the disk like member, but terminating short of the inner faces of the side plates, springs in said spring pockets mounted in part to have a fixed connection with the opposite side plates, and spacing and reinforcing members secured to project from the opposite faces of the disk like member outwardly to bear against the inner faces of the opposite side members beyond the ends of the tubular pocket portions at places between the spring pockets and the hub and also between the spring pockets and the tread member.

2. In a wheel of the character described, a hub member, a tread member and resilient connections therebetween comprising side plates secured to the hub member and relatively free at their outer edges to provide a passageway therebetween, a ring shaped flat disk like member secured at its outer edge to the tread member and relatively free at its inner edge, said last mentioned member passing between the side plates and having therebetween a circular series of spring pockets formed by tubular portions projecting outwardly from the opposite faces of the disk like member, but terminating short of the inner faces of the side plates, springs in said spring pockets mounted in part to have a fixed connection with the opposite side plates and spacing and reinforcing members secured to project from the opposite faces of the disk like member outwardly to bear against the inner faces of the opposite side members beyond the ends of the tubular pocket portions at places between the spring pockets and the hub and also between the spring pockets and the tread member, the outer edges of the side plates being closed inwardly beyond the last mentioned or outermost spacing and bearing members and adjacent to the side faces of the disk like member working therebetween.

In testimony whereof I hereunto affix my signature in the presence of two witnesses.

WILLIAM D. NEILS.

Witnesses:
H. C. STITT,
G. E. LAW.